No. 822,640. PATENTED JUNE 5, 1906.
T. M. WADE.
MILKING MACHINE.
APPLICATION FILED SEPT. 22, 1905.
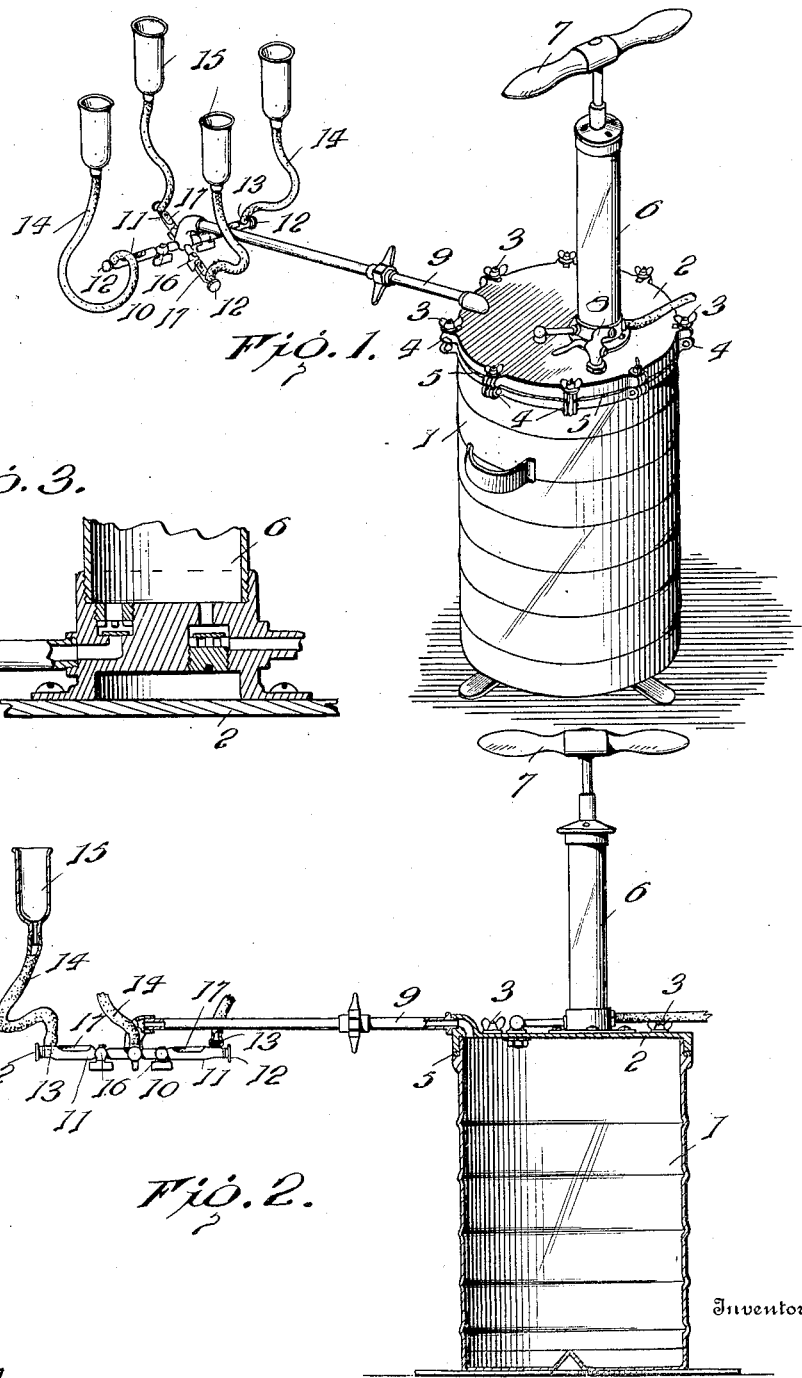
Witnesses
Inventor
T. M. Wade
By Lacey, Attorneys

UNITED STATES PATENT OFFICE.

THADIOUS M. WADE, OF LITHOPOLIS, OHIO.

MILKING-MACHINE.

No. 822,640.　　Specification of Letters Patent.　　Patented June 5, 1906.

Application filed September 22, 1905. Serial No. 279,675.

*To all whom it may concern:*

Be it known that I, THADIOUS M. WADE, a citizen of the United States, residing at Lithopolis, in the county of Fairfield and State of Ohio, have invented certain new and useful Improvements in Milking-Machines, of which the following is a specification.

This invention embodies improvements in milking-machines consisting mainly of a receptacle for receiving the milk and suitable tubes and teat-cups whereby the milk-receiving receptacle is adapted to be connected with the bag of the animal in the milking operation.

In carrying out the invention the milk-receiving receptacle comprises a vacuum-tank, a pump being connected therewith to create a partial vacuum in the tank, and the mechanism includes a special form of header connected with the tank and adapted to be connected with the tubes which are attached to the teat-cups.

For a full description of the invention and the merits thereof and also to acquire a knowledge of the details of construction of the means for effecting the result reference is to be had to the following description and accompanying drawings, in which—

Figure 1 is a perspective view of the machine embodying the invention. Fig. 2 is a vertical sectional view thereof. Fig. 3 is a detail section of the lower portion of the pump and means connecting the same to the cover, parts broken away.

Corresponding and like parts are referred to in the following description and indicated in all the views of the drawings by the same reference characters.

In the drawings the numeral 1 designates the receptacle or tank to which the milk is conducted when the machine is in operation, and said tank may be of any suitable size necessary for the purposes of the invention. The tank 1 is provided with a suitable cover 2, removable therefrom, and a number of small pivoted screw-clamps 3 are secured to the upper portion of the tank and are adapted to coact with lugs 4 on the cover, securing the latter thereto. A washer 5 is preferably interposed between the tank and the cover thereof, so that when the cover is secured in place an air-tight connection will be established between the same and the receptacle 1. The pump 6 is of the exhaust type and is attached rigidly to the upper side of the cover 2, being operable by a suitable handle 7. The cover 2 is also furnished with a cock or faucet 8, which admits of emptying the tank after the same has been filled. Projecting laterally from the cover and connected with an opening through said cover is a pipe 9, the outer end of which is formed with a header 10, comprising a plurality of radial tubes 11, connected to a common head. The pipe 9 is rigid and projects a sufficient distance from the tank or receptacle 1 to permit of the use of comparatively short tubes in connecting the header with the teats of the animal. The above is advantageous in that the weight of long tubes ordinarily connecting the tank with the teat-cups is dispensed with and this weight is of course removed from the bag of the animal. The several tubes 11 are provided at the outer ends thereof with screw-plugs 12, readily removable for cleansing purposes, and adjacent the plugs 12 are located upwardly-projecting nipples 13, admitting of ready attachment of the milk tubes 14, which are provided at the outer ends thereof with teat-cups 15. Between the nipples 13 and the point of connection of the tubes 11 with the pipe 9 are arranged the valves 16, which are adapted to cut off communication between the pipe 9 and the tubes 14. Between the valves 16 and the nipples 13 each of the tubes 11 is cut away, and the cutaway portion is closed by a transparent plate 17, of glass or any other similar transparent material, whereby the flow of the lacteal fluid from the tubes 14 through the tubes 11 may be observed. In actual operation the pump 6 is first worked until a partial vacuum has been created in the tank 1. The tank may now be located adjacent the animal to be milked and the teat-cups 15 are applied to the bag, receiving the teats of the animal, the valves 16 being opened so as to create a suction whereby the cups 15 are made to adhere to the bag in the customary way. It will be obvious that the milk will be readily extracted as soon as the valves 16 have been opened and the cups 15 properly applied, and an important feature of the invention resides in the fact that it is not necessary to operate any mechanism during the milking operation which would be likely to irritate the animal or otherwise disturb it. Such advantage is secured, of course, because of the disposition of the pump and the manner of connecting the teat-cups with the receptacle 1, whereby a constant partial vacuum may be maintained in the receptacle 1 even though the same is being filled with fluid.

Having thus described the invention, what is claimed as new is—

A milking-machine comprising a milk-receptacle with a removable top having fastening devices for clamping it to the milk-receptacle, an exhaust-pump supported by said top, a radially-extending pipe rigidly secured to and supported by said top and extending therefrom in an approximately horizontal direction, a header connected to the outer end of said rigid pipe and consisting of a plurality of radial tubes connected to a common head, each of said tubes being provided near its outer end with an upwardly-projecting nipple, a plug in the end of each tube beyond the said nipple, a valve secured to each tube near the inner end thereof, a transparent plate in each tube between the plug and the valve and teat-cups provided with tubes connected to said nipples.

In testimony whereof I affix my signature in presence of two witnesses.

THADIOUS M. WADE. [L. S.]

Witnesses:
THEODORE KRAMER,
CHARLES TERBUSH.